United States Patent Office 2,986,565
Patented May 30, 1961

2,986,565

SYNTHESIS OF α-CARBOALKOXY-α-NITRO-β-(3-INDOLYL)-PROPIONIC ACID ALKYL ESTERS

Toru Okuda, Ibaraki-shi, and Shiro Akabori, Ashiya-shi, Japan, assignors to Ajinomoto Co., Inc., Tokyo, Japan No Drawing. Filed Mar. 18, 1959, Ser. No. 800,120

Claims priority, application Japan Mar. 24, 1958

2 Claims. (Cl. 260—319)

This invention relates to a synthetic process for the preparation of an α-carboalkoxy-α-nitro-β-(3-indolyl)-propionic acid alkyl ester from indol and 1,1,5,5-tetracarboalkoxy-1,5-dinitro-3-azapentane.

The alkyl ester is an important intermediate compound for synthesizing tryptophan which has a number of important uses, particularly in the fields of nutrition and pharmacology.

Tryptophan is usually prepared by a synthetic process employing indol and acetamidomalonate, or gramine and acetamidomalonate as starting materials. However, this is an inefficient and costly procedure because of the use of such expensive materials as acetamidomalonate or gramine.

A general object of the present invention is to provide a synthetic process for producing a very useful intermediate compound for synthesizing tryptophan with ease at low cost and at a high yield.

These and other objects of the invention will become apparent hereinafter.

We have found that, when a 1,1,5,5-tetracarboalkoxy-1,5-dinitro-3-azapentane, having the general formula

$(ROOC)_2C(NO_2).CH_2.NH.CH_2(NO_2).C(COOR)_2$ wherein R denotes methyl or ethyl radical, is reacted with indol, an α-carboalkoxy-α-nitro-β-(3-indolyl)-propionic acid alkyl ester, an intermediate compound for the synthesis of tryptophan, is obtained. When said intermediate compound is subjected to reduction and hydrolysis, tryptophan is easily produced, as shown in the following chemical reaction formulae:

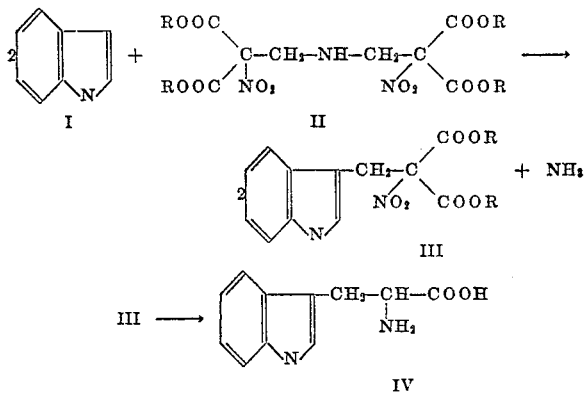

1,1,5,5-tetracarboalkoxy-5-dinitro-3-azapentane may be prepared by the reaction of a nitromalonic acid alkyl ester, formaldehyde and an ammonium salt in accordance with Battaglia's process (A. Battaglia, Gaz. chim. ital., 38, I, 356 (1908); Chem. Z., Ib, 2020 (1908)).

In the structure of the 1,1,5,5-tetracarboalkoxy-2,5-dinitro-3-azapentane, the linkages between the nitrogen atom at the 3-position and the adjacent carbon atoms are loose enough, due to the influences of the negative carboalkoxyl and nito radicals at both ends of the molecule, to split, the remaining radical combining with indol at its β-position. Since ammonia produced during the reaction easily evaporates from the reaction system, the reaction proceeds irreversibly.

The alkylation at the β-position of the indol nucleus by using 1,1,5,5-tetracarboalkoxy-1,5-dinitro-3-azapentane, which may be recognized as a secondary base of the Mannich-type, is a reaction discovered by us and forming the basis of the present invention.

The alkylation may be easily carried out by heating both reactants at about 100° C. to 150° C., while introducing a stream of inactive gas, in either absence or presence of an inactive solvent having a boiling point of about 100° C. to 150° C., for example toluene, xylene or the like, thus producing an α-carboalkoxy-α-nitro-β-(3-indolyl)-propionic acid alkyl ester with as high a yield as 85% or more of theoretical quantity while ammonia gas vigorously escapes.

If the reaction to produce the intermediate compound by heating the mixture of azapentane and indol is carried out below 100° C., it requires a much longer time, while decomposition takes place if carried out above 150° C. The favorable temperature for the reaction ranges from 100° C. to 150° C. and the optimum temperature is between 130° C. and 140° C.

The reaction temperature may be more easily controlled in the presence of an inactive solvent having a boiling point between 100° C. and 150° C., such as toluene or xylene. However, in cases where control of the reaction temperature is intrinsically easy, such solvents are of no use, since the presence or absence of them has no appreciable influence on neither the reaction velocity nor the yield.

The following examples illustrate the invention but are not to be construed as limiting the same:

*Example 1*

9.0 g. of 1,1,5,5-tetracarbethoxy-1,5-dinitro-3-azapentane (II, $R=C_2H_5$) and 9.4 g. of indol were dissolved in 40 ml. of xylene. The solution was heated at a temperature of 130–140° C. under reflux while introducing a stream of nitrogen. The reaction started and ammonia gas evolved. After keeping it at the same temperature for 8 hours, evolution of ammonia substantially ceased. Xylene was distilled off and the residue was repeatedly extracted with petroleum ether to recover the unreacted indol. 10.8 g. of α-carbethoxy-α-nitro-β-(3-indolyl)-propionic ethyl ester (III, $R=C_2H_5$) was obtained as a viscous red oil.

This product (10.7 g) was dissolved in 60 ml. of methyl alcohol and 30 ml. of a solution of 0.9 g. of metallic sodium in ethyl alcohol was added dropwise therein during 3 hours. The solution was dissolved in 200 ml. of cold water and neutralized with 7% hydrochloric acid. The separated oil was extracted with ether and then said ether was distilled off. Thus one of the two carbethoxyl radicals in the molecule of said propionic ethyl ester has been eliminated.

The thus obtained α-nitro-β-(3-indolyl)-propionic acid ethyl ester was dissolved in 40 ml. of methyl alcohol, 0.5 g. of Raney nickel catalyst was added and heated at a temperature of 80° C. and under an initial hydrogen pressure of 80 atm. pressure for 1.5 hours to reduce said ester therein to α-amino-β-(3-indolyl)-propionic ethyl ester.

After the catalyst was separated and the solvent was distilled off, the solution was mixed with 30 ml. of 7% caustic soda solution and heated at a temperature of 80° C. for one hour. Thus the hydrolysis has been accomplished.

The reaction mixture was added to active carbon while hot and filtered. The decolorized filtrate was adjusted to a pH of 5.9 with acetic acid and cooled to give 5.0 g. of white crystals of DL-tryptophan which showed a decomposition point of 275–280° C.

*Example 2*

11.9 g. of 1,1,5,5-tetracarbomethoxy-dinitro-3-azapentane (II, R=CH₃) and 14.0 g. of indol were heated at a temperature of 130–140° C. in the presence of 50 ml. of xylene for 6 hours while introducing a stream of nitrogen. After xylene has been distilled off, the residue was repeatedly extracted with petroleum ether to recover unreacted indol, thus giving 14.7 g. of α-carbomethoxy-α-nitro-β-(3-indolyl) propionic acid methyl ester (III, R=CH₃).

*Example 3*

13 g. of 1,1,5,5-tetracarboethoxy-dinitro-3-azapentane and 14 g. indol were heated at 130–140° C. for 6 hours while introducing a stream of H₂. The reaction product was repeatedly extracted with petroleum ether to recover unreacted indol, thus giving 16 g. α-carboethoxy-α-nitro-β-(3-indolyl)-propionic acid ethyl ester (II, R=C₂H₅).

We claim:

1. A process for producing an α-carboalkoxy-α-nitro-β-(3-indolyl-propionic acid alkyl ester wherein the alkoxy radical is selected from the group consisting of methoxy and ethoxy and the alkyl radical is selected from the group consisting of methyl and ethyl which comprises: heating an 1,1,5,5 - tetracarboalkoxy - 1,5-dinitro-3 - azapentane, wherein the alkoxy radical is selected from the group consisting of methoxy and ethoxy, and indol at a temperature between 100° C. and 150° C. while introducing a stream of inactive gas into the heated materials.

2. A process for producing an α-carboalkoxy-α-nitro-β-(3-indolyl)-propionic acid alkyl ester wherein the alkoxy radical is selected from the group consisting of methoxy and ethoxy and the alkyl radical is selected from the group consisting of methyl and ethyl which comprises: heating an 1,1,5,5-tetracarboalkoxy-1,5-dinitro-3-azapentane, wherein the alkoxy radical is selected from the group consisting of methoxy and ethoxy and indol at a temperature between 100° C. and 150° C. in the presence of an inactive aromatic hydrocarbon selected from the group consisting of aromatic hydrocarbon solvents having a boiling point between 100° C. and 150° C. while introducing a stream of inactive gases into the heated materials.

References Cited in the file of this patent

UNITED STATES PATENTS

| | | |
|---|---|---|
| 2,528,928 | Weisblat et al. | Nov. 7, 1950 |
| 2,546,960 | Moe et al. | Apr. 3, 1951 |